US012793031B2

(12) United States Patent
Nishida

(10) Patent No.: US 12,793,031 B2
(45) Date of Patent: Nov. 10, 2026

(54) MONEY PROCESSING SYSTEM AND MONEY PROCESSING METHOD

(71) Applicant: GLORY LTD, Himeji (JP)

(72) Inventor: Shimpei Nishida, Himeji (JP)

(73) Assignee: GLORY LTD., Himeji (JP)

( * ) Notice: Subject to any disclaimer, the term of this patent is extended or adjusted under 35 U.S.C. 154(b) by 201 days.

(21) Appl. No.: 18/912,660

(22) Filed: Oct. 11, 2024

(65) Prior Publication Data

US 2025/0131398 A1 Apr. 24, 2025

(30) Foreign Application Priority Data

Oct. 18, 2023 (JP) ................................ 2023-179618

(51) Int. Cl.
*G06Q 20/10* (2012.01)
*G07F 19/00* (2006.01)

(52) U.S. Cl.
CPC ....... *G06Q 20/1085* (2013.01); *G07F 19/206* (2013.01)

(58) Field of Classification Search
CPC . G06Q 20/1085; G07F 19/206; G07F 19/209; G07F 19/211
See application file for complete search history.

(56) References Cited

U.S. PATENT DOCUMENTS 8,225,988 B1 * 7/2012 Bohen .................. G07F 19/209 235/379
2017/0140353 A1 * 5/2017 Burdick ................ G07F 19/209

FOREIGN PATENT DOCUMENTS

JP H05135253 A * 6/1993 ............ G06F 15/30
JP 4077053 B2 4/2008
JP 5250458 B2 7/2013

OTHER PUBLICATIONS

Anholt et al.: An Inventory -Routing Problem with Pickups and Deliveries Arising in the Replenishment of Automated Teller Machines, Nov. 2013, CIRRELT, pp. 1-31 (Year: 2013).*

* cited by examiner

*Primary Examiner* — Bijendra K Shrestha
(74) *Attorney, Agent, or Firm* — XSENSUS LLP

(57) ABSTRACT

A money processing system includes first and second money processing devices and a computer that executes notification management based on the inventory amount of the first money processing device and the inventory amount of the second money processing device. The computer refrains from issuing a notification of prompting execution of first processing in the second money processing device in a case where a notification of prompting execution of the first processing in the first money processing device is issued, and refrains from issuing a notification of prompting execution of second processing in the second money processing device in a case where a notification of prompting execution of the second processing in the first money processing device is issued.

15 Claims, 11 Drawing Sheets

MONEY PROCESSING SYSTEM AND MONEY PROCESSING METHOD

CROSS-REFERENCE TO RELATED APPLICATION

This application claims priority to Japanese Patent Application No. 2023-179618 filed on Oct. 18, 2023, the entire disclosure of which is incorporated by reference herein.

BACKGROUND

The technique disclosed here relates to a money processing system and a money processing method.

A conventional client guidance system guides, at a service office of a bank, a client to an automatic teller machine (ATM) selected from a plurality of ATMs. Specifically, the client guidance system includes a state information collector and a client information collector. The state information collector collects information on each of the plurality of ATMs. The collected information includes information on the function of the ATM and the inventory amount of the ATM. The client information collector acquires, via a client terminal, information on a transaction desired by the client. The client guidance system guides the client to the selected ATM based on the information on the transaction desired by the client and the information on the ATM. For example, a client who desires a deposit transaction is guided to an ATM with a lower inventory amount, and a client who desires a withdrawal transaction is guided to an ATM with a higher inventory amount.

A conventional deposit system is installed in a large-scale store group such as a department store or a shopping center. The deposit system includes a plurality of deposit machines. The deposit machine performs processing of sales proceeds deposit from each store. The deposit system checks deposit data on each denomination via authentication processing by a responsible person of each store, and guides the responsible person to a deposit machine selected based on the deposit data on each denomination and the inventory amount of each deposit machine.

SUMMARY

The technique disclosed here relates to a money processing system. The money processing system includes a first money processing device that performs first processing involving a process of taking in money or second processing involving a process of dispensing money in response to user selection a second money processing device that performs the first processing or the second processing in response to user selection and a computer connected to the first money processing device and the second money processing device, the computer executing, based on the inventory amount of money stored in the first money processing device and the inventory amount of money stored in the second money processing device, notification management including a notification of prompting execution of the first processing in the first money processing device or the second money processing device and a notification of prompting execution of the second processing in the first money processing device or the second money processing device, and the computer refrains from issuing a notification of prompting execution of the first processing in the second money processing device in a case where a notification of prompting execution of the first processing in the first money processing device is issued, and refrains from issuing a notification of prompting execution of the second processing in the second money processing device in a case where a notification of prompting execution of the second processing in the first money processing device is issued.

DETAILED DESCRIPTION

Figure 1:
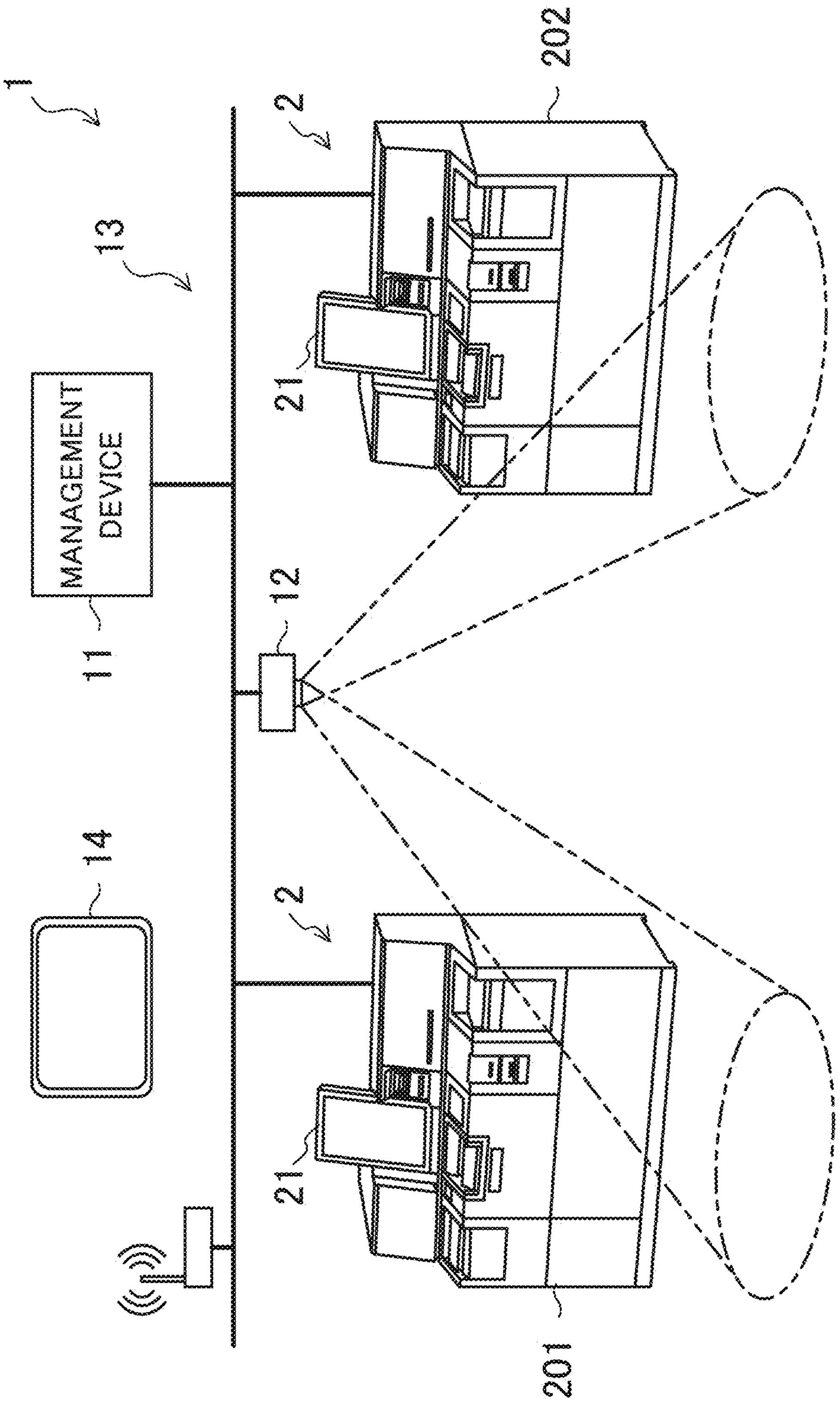
FIG. 1 shows a money processing system.

For example, a money processing device placed at a service office of a financial facility is basically a device to be operated by a client having visited the service office. The money processing device to be operated mainly by the client is effective for saving manpower for operation of the service office.

For example, in a case where the inventory amount of the money processing device is full and a deposit transaction cannot be performed or a case where the inventory amount of the money processing device is empty and a withdrawal transaction cannot be performed, a responsible person of the financial facility or a responsible person of cash-in-transit (CIT) performs money collection or refilling processing so that the transaction can be made via the money processing device. In order to enhance the efficiency of operation of the service office, there has been a demand for continuous operation of the money processing device with no manpower by avoiding the inventory amount of the money processing device from being full or empty.

When the inventory amount of the money processing device becomes full or empty, this money processing device cannot be used until the responsible person handles the situation, and for this reason, a processing efficiency at the service office is lowered.

Note that the continuous operation of the money processing device with no manpower is not limited to the money processing device placed at the service office of the financial facility, and is also demanded for a money processing device that performs processing of depositing proceeds from sales from a store and processing of withdrawing a change fund for a store. The technique disclosed here contributes to the continuous operation of the money processing device.

The technique disclosed here relates to a money processing system. The money processing system includes a first money processing device that performs first processing involving a process of taking in money or second processing involving a process of dispensing money in response to user selection a second money processing device that performs the first processing or the second processing in response to user selection and a computer connected to the first money processing device and the second money processing device, the computer executing, based on the inventory amount of money stored in the first money processing device and the inventory amount of money stored in the second money processing device, notification management including a notification of prompting execution of the first processing in the first money processing device or the second money processing device and a notification of prompting execution of the second processing in the first money processing device or the second money processing device, and the computer refrains from issuing a notification of prompting execution of the first processing in the second money processing device in a case where a notification of prompting execution of the first processing in the first money processing device is issued, and refrains from issuing a notification of prompting execution of the second processing in the second money processing device in a case where a notification of prompting execution of the second processing in the first money processing device is issued.

The first money processing device and the second money processing device perform the first processing or the second processing in response to the user selection. The user can perform the first processing and the second processing by any one of the first money processing device or the second money processing device.

Note that the first processing is, for example, a deposit transaction. In a case where the first money processing device and the second money processing device are placed at a service office of a financial facility, the deposit transaction includes deposit in a customer's account. The first processing may be a transfer transaction using cash. In a case where the first money processing device and the second money processing device are placed at a retail store, the deposit transaction includes deposit of proceeds from sales from the store. The second processing is, for example, a withdrawal transaction. In a case where the first money processing device and the second money processing device are placed at the service office of the financial facility, the withdrawal transaction includes withdrawal from the customer's account. In a case where the first money processing device and the second money processing device are placed at the retail store, the withdrawal transaction includes withdrawal of a change fund for the store.

The computer acquires the inventory amount of the first money processing device and the inventory amount of the second money processing device. In the money processing device with a low inventory amount, limiting the execution of the second processing involving dispensing money and performing the first processing involving taking in money is beneficial for continuous operation. This is due to the avoidance of the risk of the inventory amount being empty. In the money processing device with a high inventory amount, limiting the execution of the first processing involving taking in money and performing the second processing involving dispensing money is beneficial for continuous operation. This is due to the avoidance of the risk of the inventory amount being full.

The computer executes, based on the inventory amount of the first money processing device and the inventory amount of the second money processing device, the notification management including a notification of prompting execution of the first processing in the first money processing device or the second money processing device and a notification of prompting execution of the second processing in the first money processing device or the second money processing device.

For example, in a case where the inventory amount of the first money processing device is low, the computer may issue a notification of prompting execution of the first processing in the first money processing device. In a case where the inventory amount of the second money processing device is low, the computer may issue a notification of prompting execution of the first processing in the second money processing device. When the user performs the first processing in the first money processing device or the second money processing device according to the notification, the inventory amount of the first money processing device or the inventory amount of the second money processing device increases.

For example, in a case where the inventory amount of the first money processing device is high, the computer may issue a notification of prompting execution of the second processing in the first money processing device. In a case where the inventory amount of the second money processing device is high, the computer may issue a notification of prompting execution of the second processing in the second money processing device. When the user performs the second processing in the first money processing device or the second money processing device according to the notification, the inventory amount of the first money processing device or the inventory amount of the second money processing device decreases.

The money processing system allows the continuous operation of the first money processing device and the second money processing device. The money processing system is useful, for example, for saving manpower at the service office of the financial facility.

The money processing system performs the management based on the inventory amount of the first money processing device and the inventory amount of the second money processing device. As in the conventional system, the information on the processing desired by the user is not acquired. Moreover, the money processing system only issues the notification, and does not force the user to use the first money processing device or the second money processing device. For example, even when a notification of prompting execution of the first processing in the first money processing device is issued, the user can perform the second processing in the first money processing device. The money processing system can be built using the existing first money processing device, second money processing device, and computer with the minimum change. A cost of introducing the money processing system is relatively low.

The money processing system refrains from issuing a notification of prompting execution of the first processing in the second money processing device in a case where a notification of prompting execution of the first processing in the first money processing device is issued. The user who desires the second processing may perform the second processing in the second money processing device without purposefully performing the second processing in the first money processing device. Moreover, the money processing system refrains from issuing a notification of prompting execution of the second processing in the second money processing device in a case where a notification of prompting execution of the second processing in the first money processing device is issued. The user who desires the first processing may perform the first processing in the second money processing device without purposefully performing the first processing in the first money processing device.

In the money processing system including the first money processing device and the second money processing device, the first money processing device and the second money processing device perform the first processing and the second processing with the processing divided, and therefore, the processing efficiency is improved.

The computer may issue a notification of prompting execution of the second processing in the second money processing device in a case where a notification of prompting execution of the first processing in the first money processing device is issued, and may issue a notification of prompting execution of the first processing in the second money processing device in a case where a notification of prompting execution of the second processing in the first money processing device is issued.

The first money processing device and the second money processing device can execute the first processing and the second processing with the processing divided, and therefore, the money processing system allows the continuous operation of the first money processing device and the second money processing device while maintaining a high processing efficiency.

The first money processing device may have a first storage, and may store taken-in first money in the first storage and dispense the first money fed out of the first storage, the second money processing device may have a first storage, and may store taken-in first money in the first storage and dispense the first money fed out of the first storage, and the computer may execute, based on the inventory amount of the first storage of the first money processing device and the inventory amount of the first storage of the second money processing device, notification management including a notification of prompting execution of the first processing of the first money in the first money processing device or the second money processing device and a notification of prompting execution of the second processing of the first money in the first money processing device or the second money processing device.

The money processing system issues the notification based on the inventory amount of the first money of each of the first money processing device and the second money processing device. The first money may be money most handled in the first money processing device and the second money processing device. This reduces particular money in the first money processing device and the second money processing device from being full or empty. As described above, the money processing system allows the continuous operation of the first money processing device and the second money processing device.

The first money processing device may have a second storage, and may store taken-in second money in the second storage and dispense the second money fed out of the second storage, the second money processing device may have a second storage, and may store taken-in second money in the second storage and dispense the second money fed out of the second storage, and the computer may execute, based on the inventory amount of the second storage of the first money processing device and the inventory amount of the second storage of the second money processing device, notification management including a notification of prompting execution of the first processing of the second money in the first money processing device or the second money processing device and a notification of prompting execution of the second processing of the second money in the first money processing device or the second money processing device.

Each of the first money processing device and the second money processing device stores the first money and the second money in different storages. The money processing system can individually issue the notifications related to the first money and the second money based on the inventory amounts of the first money and the second money.

The first money may be money of a first denomination, and the second money may be money of a second denomination different from the first denomination.

The first money may be money of a first currency, and the second money may be money of a second currency different from the first currency.

The computer may issue a notification of prompting execution of the first processing in the first money processing device or the second money processing device in a case where the storage rate or quantity of money stored in the first money processing device or the second money processing device is a lower threshold limit or less, and a notification of prompting execution of the second processing in the first money processing device or the second money processing device in a case where the storage rate or quantity of money stored in the first money processing device or the second money processing device is an upper threshold limit or more.

Here, the storage rate is the rate of a storage amount to a storage capacity. The storage amount may be a storage quantity. In a case where the storage rate or quantity is the lower threshold limit or less, the first money processing device or the second money processing device may become empty. A notification of prompting execution of the first processing in the first money processing device or the second money processing device avoids the first money processing device or the second money processing device from being empty.

In a case where the storage rate or quantity is the upper threshold limit or more, the first money processing device or the second money processing device may become full. A notification of prompting execution of the second processing in the first money processing device or the second money processing device avoids the first money processing device or the second money processing device from being full.

The first money processing device may have a first display, the second money processing device may have a second display, and the computer may issue a notification of prompting execution of the first processing or the second processing in the first money processing device via the first display, and a notification of prompting execution of the first processing or the second processing in the second money processing device via the second display.

The user can select the money processing device that executes the desired processing from the first money processing device and the second money processing device by viewing the contents displayed on the first display or the second display.

The money processing system may further include a projector connected to the computer, and the computer may issue a notification of prompting execution of the first processing in the first money processing device or the second money processing device via the projector, and may issue a notification of prompting execution of the second processing in the first money processing device or the second money processing device via the projector.

The user can select the money processing device that executes the desired processing from the first money processing device and the second money processing device by viewing the information projected by the projector.

The money processing system may further include a tablet connected to the computer, and the computer may issue a notification of prompting execution of the first processing in the first money processing device or the second money processing device via the tablet, and may issue a notification of prompting execution of the second processing in the first money processing device or the second money processing device via the tablet.

The tablet may be carried, for example, by the responsible person of the service office of the financial facility. The responsible person can guide the user of the money processing device to the first money processing device or the second money processing device based on the information obtained via the tablet.

The computer may perform the notification management by displaying, and may display both the notification related to the first money and the notification related to the second money at overlapping timing.

The user can grasp, at one view, the contents of the notifications related to the plural types of money.

The computer may perform the notification management by displaying, and may sequentially display the notification related to the first money and the notification related to the second money.

The user easily grasps the contents of the notifications related to the plural types of money.

The first money processing device and the second money processing device may be ATMs, self-service machines, or teller machines.

The ATM and the self-service machine are, for example, devices placed at a lobby of the service office of the financial facility and operated mainly by the client of the financial facility. The teller machine is, for example, a device placed in a counter of the service office of the financial facility and operated by the responsible person, i.e., a teller, of the financial facility.

The first money processing device and the second money processing device may perform processing of at least one of a banknote or a coin.

The money processing system may further include a third money processing device that performs the first processing or the second processing in response to user selection, the computer may execute, based on the inventory amount of money stored in the first money processing device, the inventory amount of money stored in the second money processing device, and the inventory amount of money stored in the third money processing device, notification management including a notification of prompting execution of the first processing in the first money processing device, the second money processing device, or the third money processing device and a notification of prompting execution of the second processing in the first money processing device, the second money processing device, or the third money processing device, and the computer may refrain from issuing a notification of prompting execution of the first processing in at least one of the second money processing device or the third money processing device in a case where a notification of prompting execution of the first processing in the first money processing device is issued, and may refrain from issuing a notification of prompting execution of the second processing in at least one of the second money processing device or the third money processing device in a case where a notification of prompting execution of the second processing in the first money processing device is issued.

The money processing system allows the continuous operation of the first, second, and third money processing devices while enhancing the processing efficiency using the first, second, and third money processing devices.

A money processing method disclosed here includes performing, by a first money processing device, first processing involving a process of taking in money or second processing involving a process of dispensing money in response to user selection, performing, by a second money processing device, the first processing or the second processing in response to user selection, executing notification management by a computer, including a notification of prompting execution of the first processing in the first money processing device or the second money processing device and a notification of prompting execution of the second processing in the first money processing device or the second money processing device, based on an inventory amount of money stored in the first money processing device and an inventory amount of money stored in the second money processing device, and refraining from issuing, by the computer, a notification of prompting execution of the first processing in the second money processing device in a case where a notification of prompting execution of the first processing in the first money processing device is issued, and refraining from issuing a notification of prompting execution of the second processing in the second money processing device in a case where a notification of prompting execution of the second processing in the first money processing device is issued.

As described above, the first money processing device and the second money processing device can be continuously operated while ensuring a high processing efficiency.

Hereinafter, an embodiment of a money processing system and a money processing method will be described with reference to the drawings. The money processing system and the money processing method described here are examples.

(Money Processing System)

FIG. 1 shows a money processing system 1. The money processing system 1 is, for example, a system built at a lobby of a service office of a financial facility. The financial facility is, for example, a bank. The financial facility is not limited to the bank. A client having visited the service office can perform various transactions such as a deposit transaction and a withdrawal transaction via the money processing system 1.

The money processing system 1 includes a money processing device. The money processing system 1 of FIG. 1 includes a first money processing device 201 and a second money processing device 202. The first money processing device 201 and the second money processing device 202 are placed adjacent to each other at the lobby, for example. Note that the number of money processing devices is arbitrary. The first money processing device 201 and the second money processing device 202 are devices having the same structure. Note that the plurality of money processing devices included in the money processing system 1 are not necessarily the devices having the same structure. The first money processing device 201 and the second money processing device 202 are connected to a local area network (LAN) 13 built in the service office. The LAN 13 includes a wired LAN and a wireless LAN. Note that hereinafter, the collective term of the first money processing device 201 and the second money processing device 202 is a money processing device 2.

The money processing system 1 includes a management device 11. The management device 11 is one example of a computer. The management device 11 has a function of acquiring information on the first money processing device 201 and the second money processing device 202 and managing the first money processing device 201 and the second money processing device 202. The management device 11 is connected to the first money processing device 201 and the second money processing device 202 via the LAN 13.

The money processing system 1 includes a projector 12. The projector 12 may be omitted from the money processing system 1. The projector 12 is connected to the management device 11 via the LAN 13. Contents to be projected by the projector 12 are determined by the management device 11 as described later. The projector 12 projects the contents on a floor or a wall in the vicinity of the first money processing device 201 or a floor or a wall in the vicinity of the second money processing device 202 (see dash-dot-dot lines in FIG. 1).

A tablet 14 is connected to the LAN 13. The tablet 14 is an information providing terminal. A responsible person of the service office uses the tablet 14. The responsible person can acquire various types of information via the tablet 14.

(Money Processing Device)

Figure 2:
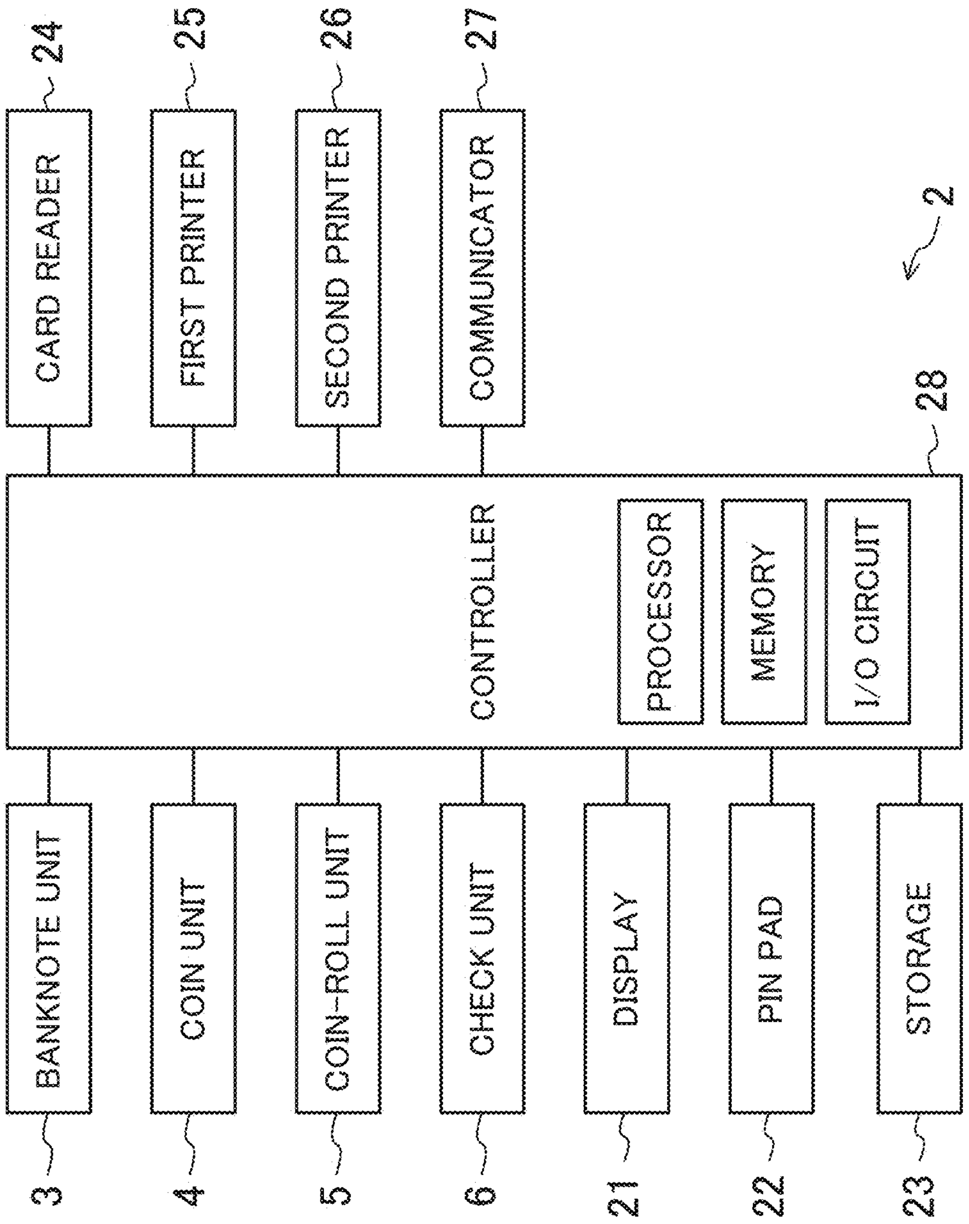
FIG. 2 shows a block diagram of a money processing device.

FIG. 2 is a block diagram of the money processing device 2. The money processing device 2 executes a transaction desired by a user through money processing. The client of the financial facility operates the money processing device 2 by oneself, thereby executing a transaction. The money processing device 2 is a device called a self-service machine. The money processing device 2 shown in the figure is one example. The money processing device 2 included in the money processing system 1 is not limited to the money processing device of FIG. 2. The money processing device 2 may be an ATM.

The money processing device 2 includes a banknote unit 3. The banknote unit 3 performs banknote processing. In response to user selection, the banknote unit 3 performs first processing involving a process of taking in a banknote or second processing involving a process of dispensing a banknote. The banknote unit 3 functions as a banknote deposit or withdrawal unit.

The money processing device 2 includes a coin unit 4. The coin unit 4 performs coin processing, more precisely loose coin processing. In response to user selection, the coin unit 4 performs first processing involving a process of taking in a coin or second processing involving a process of dispensing a coin. The coin unit 4 functions as a coin deposit or withdrawal unit. Note that the coin unit 4 may be omitted from the money processing device 2.

The first processing includes a deposit transaction. The deposit transaction is a transaction of depositing, in a customer's account, the amount of money equivalent to a banknote taken in by the banknote unit 3 and/or a coin taken in by the coin unit 4. The first processing includes a transfer transaction. The transfer transaction is a transaction of transferring, to a specified account, the amount of money equivalent to a banknote taken in by the banknote unit 3 and/or a coin taken in by the coin unit 4. The second processing includes a withdrawal transaction. The withdrawal transaction is a transaction of feeding a banknote and/or a coin withdrawn from the customer's account out of the banknote unit 3 and/or the coin unit 4.

The money processing device 2 includes a coin-roll unit 5. The coin-roll unit 5 performs coin-roll withdrawal processing. A coin-roll is a plurality of loose coins wrapped together. The coin-roll unit 5 functions as a wrapped coin withdrawal unit. Note that the coin-roll unit 5 may be omitted from the money processing device 2.

The money processing device 2 includes a check unit 6. The check unit 6 performs check processing. Note that the check unit 6 may be omitted from the money processing device 2.

Figure 5:
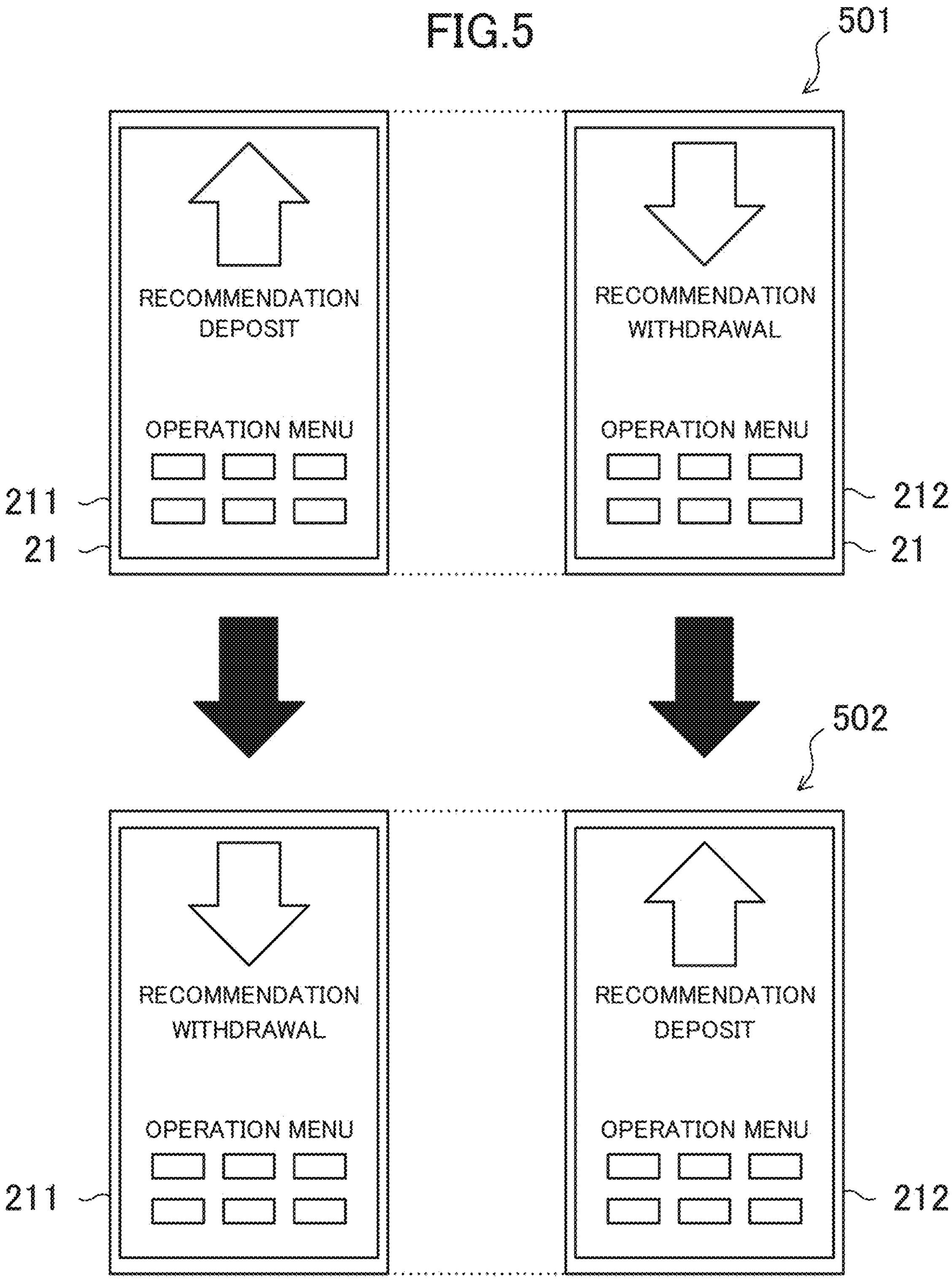
FIG. 5 shows, as an example, contents displayed on displays of the two money processing devices.

The money processing device 2 includes a display 21 (also see FIG. 1). The display 21 provides information to the user who operates the money processing device 2. The display 21 may be a touch panel display. The user can perform operation via the display 21. For example, as shown in FIG. 5, the display 21 provides an operation menu of the money processing device 2 to the user. The user operates the money processing device 2 according to the operation menu.

The money processing device 2 includes a personal identification number (PIN) pad 22. The user of the money processing device 2 inputs PIN information via the PIN pad 22. The PIN information includes, for example, a number, a sign, and an alphabet.

The money processing device 2 includes a storage 23. The storage 23 stores various types of information necessary for operation of the money processing device 2. The storage 23 stores the inventory amount of the money processing device 2, for example.

The money processing device 2 includes a card reader 24. The card reader 24 reads a user's card such as a cash card.

The money processing device 2 includes a first printer 25. The first printer 25 prints transaction contents on a receipt. The money processing device 2 includes a second printer 26. The second printer 26 prints transaction contents on paper.

The money processing device 2 includes a communicator 27. The communicator 27 performs communication with the management device 11 via the LAN 13, for example.

The money processing device 2 includes a controller 28. The controller 28 includes at least a processor, a memory, and an I/O circuit. The processor executes a program. The memory stores a program and data for operation of the money processing device 2. The memory is, for example, a random access memory (RAM) and/or a read only memory (ROM). The I/O circuit makes electric signal input/output between the controller 28 and a device connected to the controller 28. The controller 28 outputs a control signal to the device, and the money processing device 2 operates accordingly.

Figure 3:
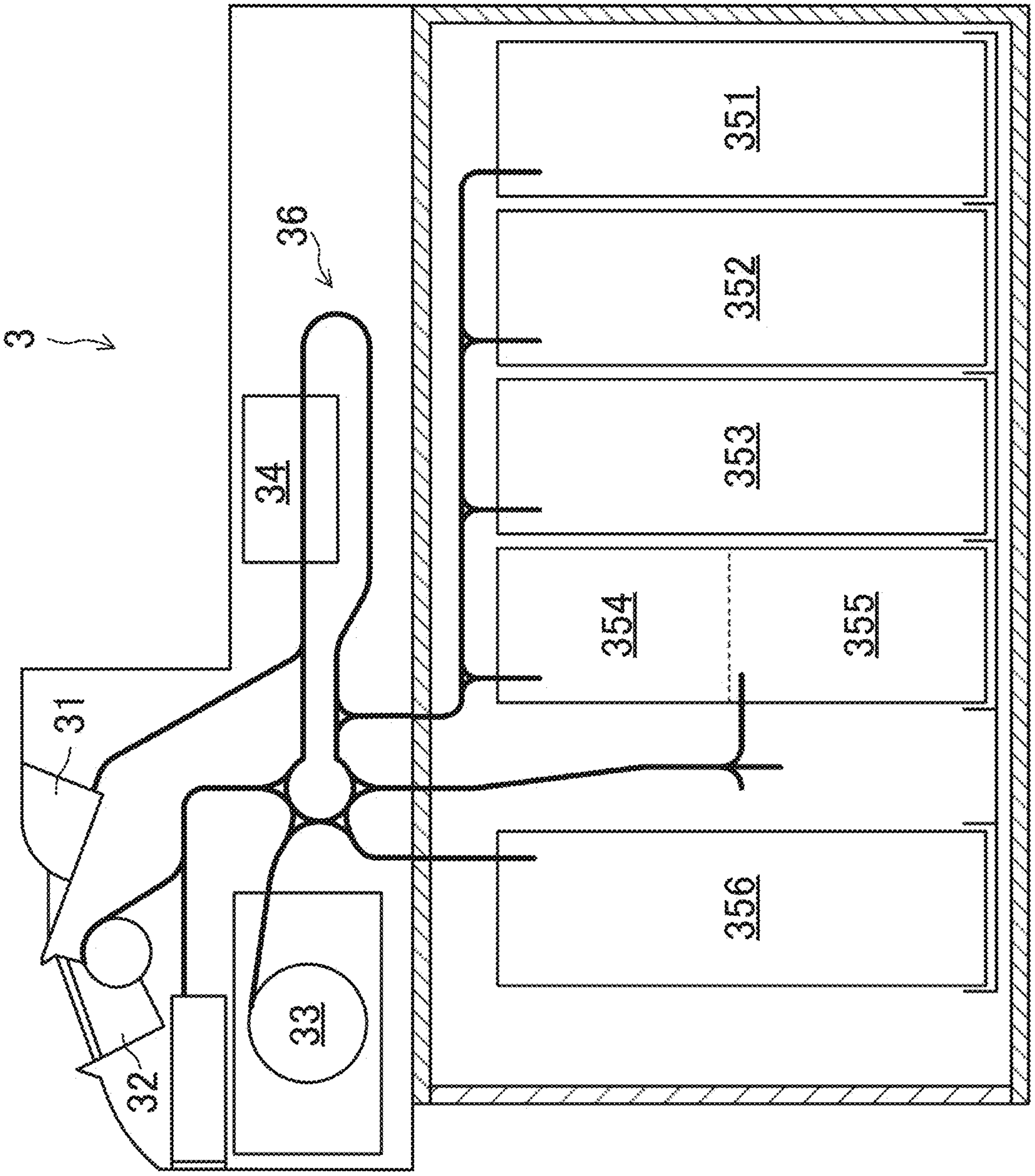
FIG. 3 shows the structure of a banknote unit.

FIG. 3 shows the structure of the banknote unit 3 as a representative of the banknote unit 3 and the coin unit 4 that perform a first transaction and a second transaction. The banknote unit 3 has a depositor 31. The depositor 31 takes, into the unit, a banknote placed into the depositor 31 by the user.

The banknote unit 3 has a withdrawer 32. The withdrawer 32 dispense a banknote out of the unit. The user can take out a banknote dispensed to the withdrawer 32.

The banknote unit 3 has a temporary storage 33. The temporary storage 33 stores a banknote, and feeds out the stored banknote.

The banknote unit 3 has a recognizer 34. The recognizer 34 recognizes a banknote taken into the unit or a banknote dispensed out of the unit. The recognizer 34 recognizes a banknote, thereby acquiring information on, e.g., a currency, a denomination, a serial number, or authenticity.

The banknote unit 3 has a plurality of storages 351, 352, 353, 354, 355, 356. The storages 351, 352, 353, 354, 355, 356 store a banknote. The plurality of storages 351, 352, 353, 354, 355, 356 stores a banknote, for example, according to denomination. The plurality of storages 351, 352, 353, 354, 355, 356 may store a banknote, for example, according to currency. The storages 351, 352, 353, 354, 355, 356 also feed out a banknote.

The banknote unit 3 has a transporter 36. The transporter 36 transports banknotes one by one. The transporter 36 has a transport path connecting a plurality of devices to each other.

The banknote unit 3 operates as follows in the first processing. The depositor 31 feeds a banknote into the unit. The recognizer 34 recognizes the banknote. The transporter 36 transports the banknote to the storage 351, 352, 353, 354, 355, 356 if the banknote is normal. The storage 351, 352, 353, 354, 355, 356 stores the normal banknote. The transporter 36 transports the banknote to the withdrawer 32 if the banknote is rejected. The rejected banknote is returned to the user via the withdrawer 32. Note that in the first processing, the transporter 36 may transport the normal banknote to the temporary storage 33. The temporary storage 33 temporarily stores the banknote. When the user confirms the processing, the temporary storage 33 feeds out the banknote. The fed-out banknote is stored in the storage 351, 352, 353, 354, 355, 356. When the user cancels the processing, the banknote fed out of the temporary storage 33 is transported to the withdrawer 32. The user confirms the processing by operating the display 21 or the PIN pad 22.

The banknote unit 3 executes the following processing in the second processing. The storage 351, 352, 353, 354, 355, 356 feeds out a banknote. The transporter 36 transports the banknote to the recognizer 34. The recognizer 34 recognizes the banknote. The transporter 36 transports the banknote to the withdrawer 32 if the banknote is normal. The transporter 36 transports the banknote to the temporary storage 33 if the banknote is not normal. The temporary storage 33 stores the banknote which is not normal. Upon completion of dispensing of the banknote to the withdrawer 32, the user takes the banknote out of the withdrawer 32. After the banknote has been taken out, the temporary storage 33 feeds out the banknote. The banknote fed out of the temporary storage 33 is stored in the storage 351, 352, 353, 354, 355, 356.

Note that the coin unit 4 has a depositor, a withdrawer, a recognizer, and a plurality of storages. As in the banknote unit 3, the coin unit 4 stores, in the storage, a coin taken in via the depositor in the first processing, and dispenses, to the withdrawer, a coin fed out of the storage in the second processing.

After the banknote unit 3 and/or the coin unit 4 have executed the first processing or the second processing, the inventory amount of the money processing device 2 changes. The storage 23 updates the inventory amount of the money processing device 2.

(Money Processing Method)

The money processing system 1 includes the plurality of money processing devices 2. The plurality of money processing devices 2 executes the processing with the processing divided, and therefore, the efficiency of the processing at the service office of the financial facility is improved.

The money processing device 2 cannot execute the deposit transaction when the storage of the banknote unit 3 or the coin unit 4 becomes full. The money processing device 2 cannot execute the withdrawal transaction when the storage of the banknote unit 3 or the coin unit 4 becomes empty. In these cases, the money processing device 2 is shut down. When the money processing device 2 is shut down, for example, the responsible person of the service office or a responsible person of CIT performs processing of collecting money from the storage of the banknote unit 3 or the coin unit 4 or processing of refilling the storage of the banknote unit 3 or the coin unit 4 with money, and the money processing device 2 is restarted. In terms of saving manpower for operation of the service office, the frequency of the collection processing and the refilling processing is required to be low.

Moreover, when the money processing device 2 is shut down, the user cannot use the money processing device 2 until the responsible person handles the situation, and for this reason, the processing efficiency at the service office is lowered.

The money processing system 1 contributes to continuous operation of the money processing device 2 while improving the processing efficiency at the service office using the plurality of money processing devices 2. Specifically, based on the inventory amount of the first money processing device 201 and the inventory amount of the second money processing device 202, the management device 11 of the money processing system 1 issues a notification of prompting execution of the first processing in the first money processing device 201 or the second money processing device 202 and a notification of execution of the second processing in the first money processing device 201 or the second money processing device 202.

More specifically, in a case where the inventory amount of the first money processing device 201 is a lower threshold limit or less, the management device 11 issues a notification of prompting execution of the first processing involving the process of taking in money in the first money processing device 201. According to the notification, the user performs the first processing in the first money processing device 201, and the inventory amount of the first money processing device 201 increases accordingly. This reduces the first money processing device 201 from being empty.

In a case where the inventory amount of the first money processing device 201 is an upper threshold limit or more, the management device 11 issues a notification of prompting execution of the second processing involving the process of dispensing money in the first money processing device 201. According to the notification, the user performs the second processing in the first money processing device 201, and the inventory amount of the first money processing device 201 decreases accordingly. This reduces the first money processing device 201 from being full.

Similarly, in a case where the inventory amount of the second money processing device 202 is the lower threshold limit or less, the management device 11 issues a notification of prompting execution of the first processing in the second money processing device 202. In a case where the inventory amount of the second money processing device 202 is the upper threshold limit or more, the management device 11 issues a notification of prompting execution of the second processing in the second money processing device 202. This reduces the second money processing device 202 from being empty and being full.

Figure 4:
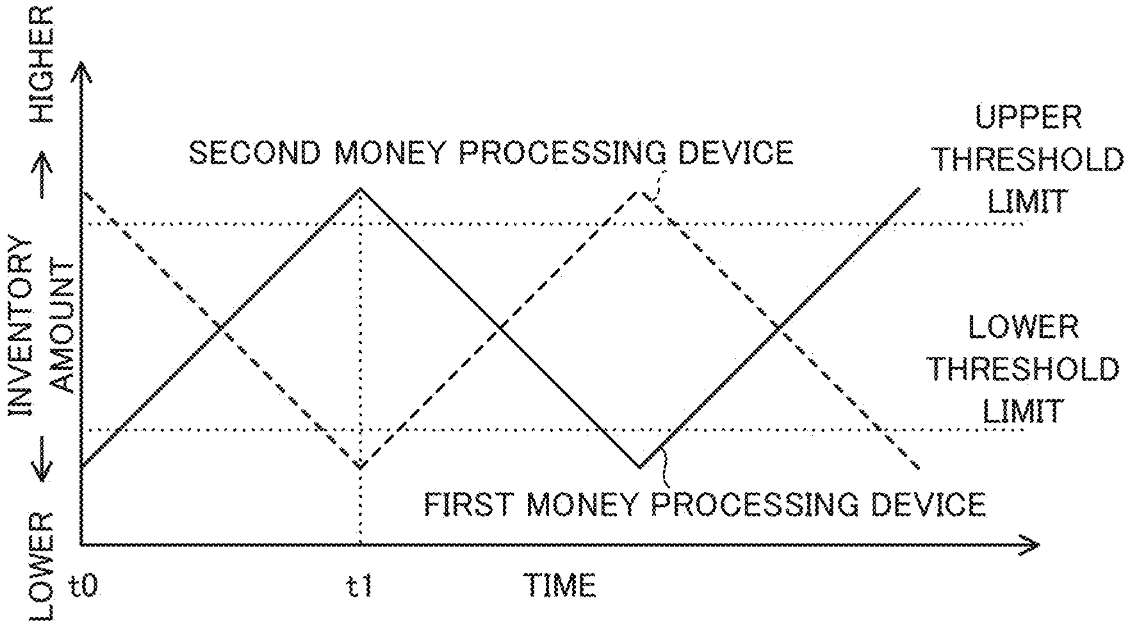
FIG. 4 shows, as an example, a change in the inventory amount of each of two money processing devices.

FIG. 4 shows, as an example, a change in the inventory amount of the first money processing device 201 and the inventory amount of the second money processing device 202 over time. It is assumed that at a time point t0, the inventory amount of the first money processing device 201 is low and is the lower threshold limit or less, and the inventory amount of the second money processing device 202 is high and is the upper threshold limit or more.

In this case, the management device 11 issues a notification of prompting execution of the first processing in the first money processing device 201, and issues a notification of prompting execution of the second processing in the second money processing device 202.

FIG. 5 is one example of the form of the notification in the money processing system 1. As shown in the upper view 501 of FIG. 5, contents displayed on a display 211 of the first money processing device 201 are contents recommending execution of the deposit transaction included in the first processing. Contents displayed on a display 212 of the second money processing device 202 are contents recommending execution of the withdrawal transaction included in the second processing.

The user performs the first processing in the first money processing device 201 according to the contents displayed on the display 211, and the inventory amount of the first money processing device 201 increases accordingly. This reduces the first money processing device 201 from being empty. The user performs the second processing in the second money processing device 202 according to the contents displayed on the display 212, and the inventory amount of the second money processing device 202 decreases accordingly. This reduces the second money processing device 202 from being full.

Referring back to FIG. 4, it is assumed that at a subsequent time point t1, the inventory amount of the first money processing device 201 is high and is the upper threshold limit or more, and the inventory amount of the second money processing device 202 is low and is the lower threshold limit or less.

In this case, the management device 11 issues a notification of prompting execution of the second processing in the first money processing device 201, and issues a notification of prompting execution of the first processing in the second money processing device 202. As shown in the lower view 502 of FIG. 5, the contents displayed on the display 211 of the first money processing device 201 change to those recommending execution of the withdrawal transaction included in the second processing. According to the contents displayed on the display 211, the user performs the second processing in the first money processing device 201, and the inventory amount of the first money processing device 201 decreases accordingly. This reduces the first money processing device 201 from being full. Moreover, the contents displayed on the display 212 of the second money processing device 202 change to those recommending execution of the deposit transaction included in the first processing. According to the contents displayed on the display 212, the user performs the first processing in the second money processing device 202, and the inventory amount of the second money processing device 202 increases accordingly. This reduces the second money processing device 202 from being empty.

The management device 11 can continuously operate the first money processing device 201 and the second money processing device 202 without these devices shut down.

The money processing system 1 performs control based on the inventory amount of the first money processing device 201 and the inventory amount of the second money processing device 202. The money processing system 1 does not acquire information on processing desired by the user as in a conventional system. Specifically, the money processing system 1 notifies the user of the processing prompted in the first money processing device 201 and the second money processing device 202 at the timing before the information on the processing desired by the user is acquired. Moreover, the money processing system 1 only issues the notification, and does not force the user to use the first money processing device 201 or the second money processing device 202. For example, even when a notification of prompting execution of the first processing in the first money processing device 201 is issued, the user can perform the second processing in the first money processing device 201. The money processing system 1 can be built using the existing first money processing device 201, second money processing device 202, and management device 11 with the minimum software change. A cost of introducing the money processing system 1 is relatively low.

Note that a service of providing, as an incentive for the user executing the processing according to the notification, a point from the financial facility to the user who has performed the processing matching the notification contents in the first money processing device 201 or the second money processing device 202 may be provided to the user.

Here, the inventory amount of the money processing device 2 may be a money storage rate in the money processing device 2. Note that the storage rate is the rate of a storage amount to a storage capacity (Storage Rate=Storage Amount/Storage Capacity). The storage amount may be a storage quantity. The management device 11 compares the storage rate with the upper threshold limit or the lower threshold limit, and this can effectively reduce the money processing device 2 from being full or empty. Note that the inventory amount of the money processing device 2 may be the quantity of money stored in the money processing device 2.

Each of the lower threshold limit and the upper threshold limit can be an arbitrary value. In a case where the inventory amount is the storage rate, a storage rate of 0% indicates empty, and a storage rate of 100% indicates full. The lower threshold limit may be 10%, and the upper threshold limit may be 90%, for example. The responsible person of the service office may set each of the lower threshold limit and the upper threshold limit. Alternatively, each of the lower threshold limit and the upper threshold limit may be automatically set according to a recommended value based on statistical information. Alternatively, each of the lower threshold limit and the upper threshold limit may be a variable automatically set according to time.

In the example of FIG. 4, the change in the inventory amount of the first money processing device 201 and the change in the inventory amount of the second money processing device 202 are exactly opposite to each other, and the notification contents for the first money processing device 201 and the notification contents for the second money processing device 202 are different from each other. Note that the example shown in FIG. 4 merely shows the graph for describing the concept, and for this reason, for practical purposes, the change in the inventory amount of the first money processing device 201 and the change in the inventory amount of the second money processing device 202 are not always exactly opposite to each other.

For example, when the inventory amount of the first money processing device 201 is the lower threshold limit or less, the inventory amount of the second money processing device 202 is not always the upper threshold limit or more. In a case where the inventory amount of the first money processing device 201 is the lower threshold limit or less and the inventory amount of the second money processing device 202 is not the upper threshold limit or more, the management device 11 may issue a notification of prompting execution of the first processing in the first money processing device 201 without issuing the notification related to the second money processing device 202. The user who desires the first processing may perform the first processing in the first money processing device 201, or may perform the first processing in the second money processing device 202. The first money processing device 201 and the second money processing device 202 execute the first processing with the processing divided, and therefore, the processing efficiency at the service office is enhanced.

The management device 11 may issue a notification of prompting execution of the first processing in the first money processing device 201 while issuing a notification of prompting execution of the second processing in the second money processing device 202 even though the inventory amount of the second money processing device 202 is not the upper threshold limit or more. That is, the management device 11 may issue a notification of prompting execution of the second processing in the second money processing device 202 regardless of the inventory amount of the second money processing device 202 in a case where the management device 11 issues a notification of prompting execution of the first processing in the first money processing device 201. In this case, many users who desire the first processing can be expected to perform the first processing not in the second money processing device 202 but in the first money processing device 201 according to the notification, and therefore, the inventory amount of the first money processing device 201 easily increases. This can further reduce the first money processing device 201 from being empty.

Note that in a case where the inventory amount of the first money processing device 201 is the upper threshold limit or more and the inventory amount of the second money processing device 202 is not the lower threshold limit or less, the management device 11 may issue a notification of prompting execution of the second processing in the first money processing device 201 without issuing the notification related to the second money processing device 202. Alternatively, the management device 11 may issue a notification of prompting execution of the second processing in the first money processing device 201, and issue a notification of prompting execution of the first processing in the second money processing device 202.

In a case where the management device 11 issues a notification of prompting execution of the first processing in the first money processing device 201, the management device 11 refrains from issuing a notification of prompting execution of the first processing in the second money processing device 202. Moreover, in a case where the management device 11 issues a notification of prompting execution of the second processing in the first money processing device 201, the management device 11 refrains from issuing a notification of prompting execution of the second processing in the second money processing device 202.

By such notification processing, a possibility of the inventory amount of the first money processing device 201 being within the range less than the upper threshold limit and greater than the lower threshold limit can be increased, and a possibility of the inventory amount of the second money processing device 202 being within the range less than the upper threshold limit and greater than the lower threshold limit can be increased.

No notification of prompting execution of the first processing or the second processing in both the first money processing device 201 and the second money processing device 202 is issued. The user can execute the first processing or the second processing using the first money processing device 201 or the second money processing device 202. The money processing system 1 can improve the processing efficiency.

Note that in a case where the inventory amount of the first money processing device 201 is the lower threshold limit or less and the inventory amount of the second money processing device 202 is the lower threshold limit or less, the management device 11 may compare the inventory amount of the first money processing device 201 and the inventory amount of the second money processing device 202 with each other, and may issue a notification of prompting execution of the first processing in the money processing device 2 with a lower inventory amount. In a case where the inventory amount of the first money processing device 201 is the upper threshold limit or more and the inventory amount of the second money processing device 202 is the upper threshold limit or more, the management device 11 may compare the inventory amount of the first money processing device 201 and the inventory amount of the second money processing device 202 with each other, and may issue a notification of prompting execution of the second processing in the money processing device 2 with a higher inventory amount.

The management device 11 can arbitrarily set the end timing of the notification after the start of the notification related to the first money processing device 201 due to the inventory amount of the first money processing device 201 reaching the lower threshold limit or less. For example, when the inventory amount of the first money processing device 201 exceeds the lower threshold limit, the management device 11 may end the notification related to the first money processing device 201. When the inventory amount of the first money processing device 201 exceeds the lower threshold limit and reaches a predetermined end threshold, the management device 11 may end the notification related to the first money processing device 201. The different notification start and end thresholds reduce repetition of the start and end of the notification. Similarly, the management device 11 can arbitrarily set the end timing of the notification after the start of the notification related to the first money processing device 201 due to the inventory amount of the first money processing device 201 reaching the upper threshold limit or more. For example, when the inventory amount of the first money processing device 201 falls below the upper threshold limit, the management device 11 may end the notification related to the first money processing device 201. When the inventory amount of the first money processing device 201 falls below the upper threshold limit and reaches a predetermined end threshold, the management device 11 may end the notification related to the first money processing device 201.

The management device 11 may issue a notification not by comparison between the inventory amount of the money processing device 2 and the lower threshold limit or the upper threshold limit but by comparison between the inventory amount of the first money processing device 201 and the inventory amount of the second money processing device 202. Specifically, the management device 11 may issue, for one of the two money processing devices 2 with a lower inventory amount, a notification of prompting execution of the first processing, and may issue, for one of the two money processing devices 2 with a higher inventory amount, a notification of prompting execution of the second processing.

The management device 11 may issue a notification using the projector 12 instead of or in addition to the notification according to the contents displayed on the display 211 of the first money processing device 201 or the display 212 of the second money processing device 202. The projector 12 may project the notification related to the first money processing device 201 on a floor or a wall in the vicinity of the first money processing device 201, and may project the notification related to the second money processing device 202 on a floor or a wall in the vicinity of the second money processing device 202. Based on the contents of the notification projected by the projector 12, the user can select the first money processing device 201 or the second money processing device 202, and can perform the first processing or the second processing in the selected money processing device 2.

Note that instead of the projector 12, a display independent of the first money processing device 201 and the second money processing device 202 may be placed in the vicinity of the first money processing device 201 and the second money processing device 202. This display displays both the contents related to the first money processing device 201 and the contents related to the second money processing device 202.

The management device 11 may issue, for the tablet 14, the notification related to the first money processing device 201 and the notification related to the second money processing device 202. The responsible person of the service office can obtain information via the tablet 14. The responsible person of the service office can properly guide the user to the first money processing device 201 or the second money processing device 202 based on the contents of the notification related to the first money processing device 201 and/or the contents of the notification related to the second money processing device 202 and the processing desired by the user and found out from the user. The processing efficiency at the service office is improved, and the shutdown of the money processing device is further reduced.

The management device 11 may execute the above-described notification management based on the inventory amount of first money as the inventory amount of the first money processing device 201 and the inventory amount of the second money processing device 202. The first money may be, for example, money of a denomination most handled in the money processing device 2. Alternatively, the first money may be, for example, money of a denomination most circulated in an area or country where the money processing device 2 is placed.

Figure 6:
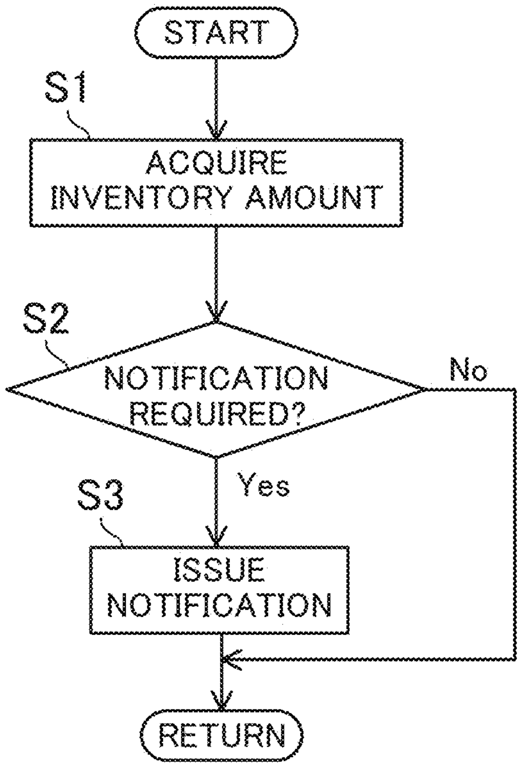
FIG. 6 shows a flowchart of control procedure of the money processing system.

FIG. 6 shows a flowchart of the notification management executed by the above-described money processing system 1. First, in Step S1 after the start, the management device 11 acquires the inventory amount of the first money processing device 201 and the inventory amount of the second money processing device 202.

Subsequently, in Step S2, based on the inventory amount of the first money processing device 201 and the inventory amount of the second money processing device 202, the management device 11 determines whether or not the notification needs to be issued. If the notification needs to be issued, the management device 11 issues a notification via the display 211, the display 212, the projector 12, and/or the tablet 14 in Step S3.

(Notification Management According to Denomination)

The management device 11 may compare the inventory amount of the first money processing device 201 and the inventory amount of the second money processing device 202 not according to the inventory amount of money of a particular type but according to, e.g., the denomination of the same currency.

Figure 7:
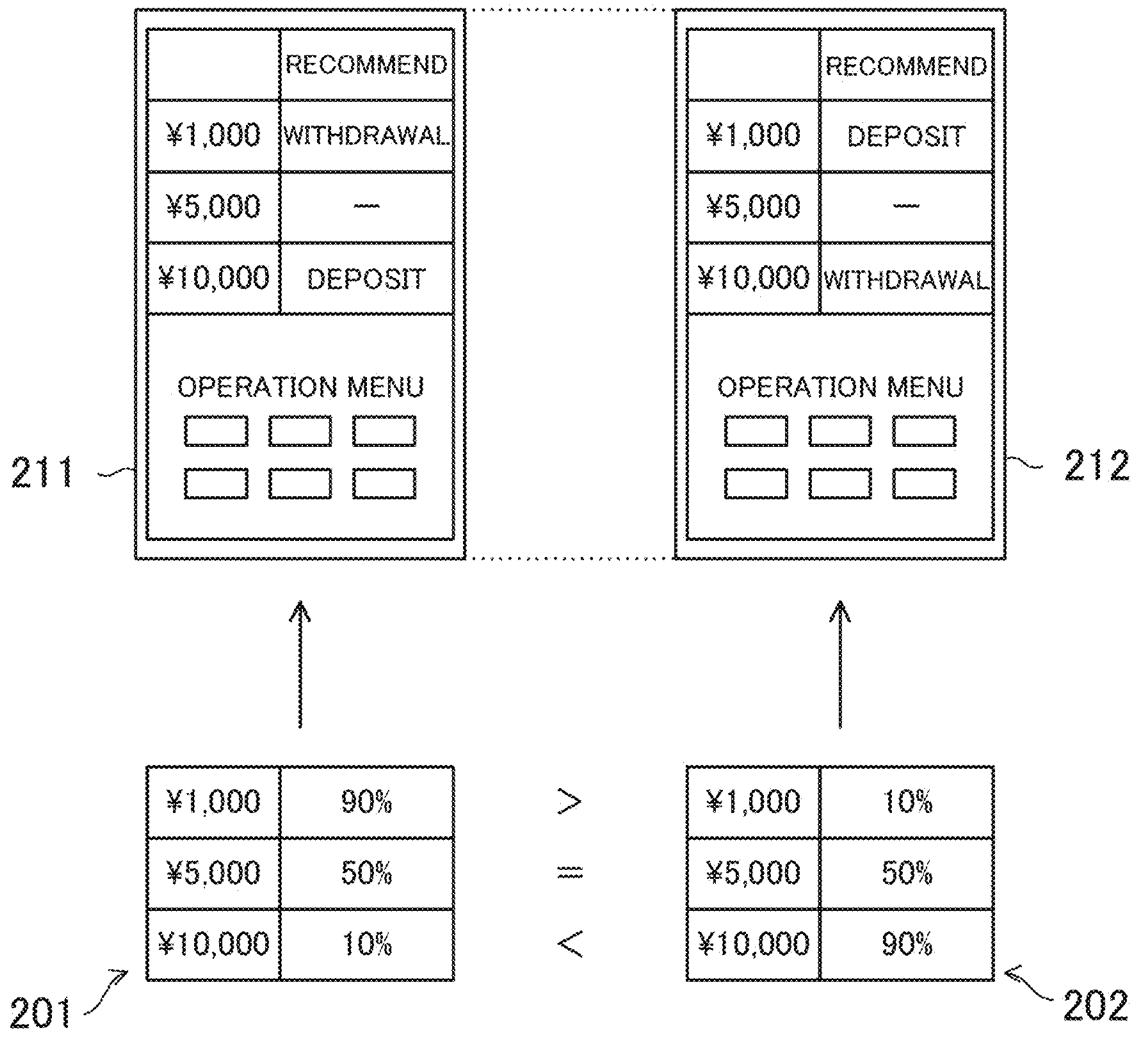
FIG. 7 shows, as an example, contents displayed on the displays of the two money processing devices.

FIG. 7 shows a notification example based on the inventory amount of the first money processing device 201 and the inventory amount of the second money processing device 202 according to three denominations of the Japanese yen. As shown in the lower view of FIG. 7, it is assumed that the inventory amount (storage rate here) of the first money processing device 201 includes a 1,000-yen bill of 90%, a 5,000-yen bill of 50%, and a 10,000-yen bill of 10%, the inventory amount of the 1,000-yen bills is the upper threshold limit or more, and the inventory amount of the 10,000-yen bills is the lower threshold limit or less. The inventory amount of the second money processing device 202 includes a 1,000-yen bill of 10%, a 5,000-yen bill of 50%, and a 10,000-yen bill of 90%, the inventory amount of the 1,000-yen bills is the lower threshold limit or less, and the inventory amount of the 10,000-yen bills is the upper threshold limit or more.

As shown in the upper view of FIG. 7, the display 211 of the first money processing device 201 issues a notification of prompting execution of the second processing for the 1,000-yen bills and prompting execution of the first processing for the 10,000-yen bills. For the 5,000-yen bills, the display 211 issues no notification because the inventory amount thereof is between the lower threshold limit and the upper threshold limit. The display 212 of the second money processing device 202 issues a notification of prompting execution of the first processing for the 1,000-yen bills and prompting execution of the second processing for the 10,000-yen bills. For the 5,000-yen bills, the display 212 issues no notification because the inventory amount thereof is between the lower threshold limit and the upper threshold limit. That is, the management device 11 may issue a notification for money of a denomination whose inventory amount is the threshold or less or the threshold or more.

The user can select the first money processing device 201 or the second money processing device 202 and execute the first processing or the second processing based on the contents of the desired processing and the contents of the notification on the displays 211, 212. By such notification processing, in units of denomination, a possibility of the inventory amount of the first money processing device 201 being within the range less than the upper threshold limit and greater than the lower threshold limit can be increased, and a possibility of the inventory amount of the second money processing device 202 being within the range less than the upper threshold limit and greater than the lower threshold limit can be increased.

Figure 8:
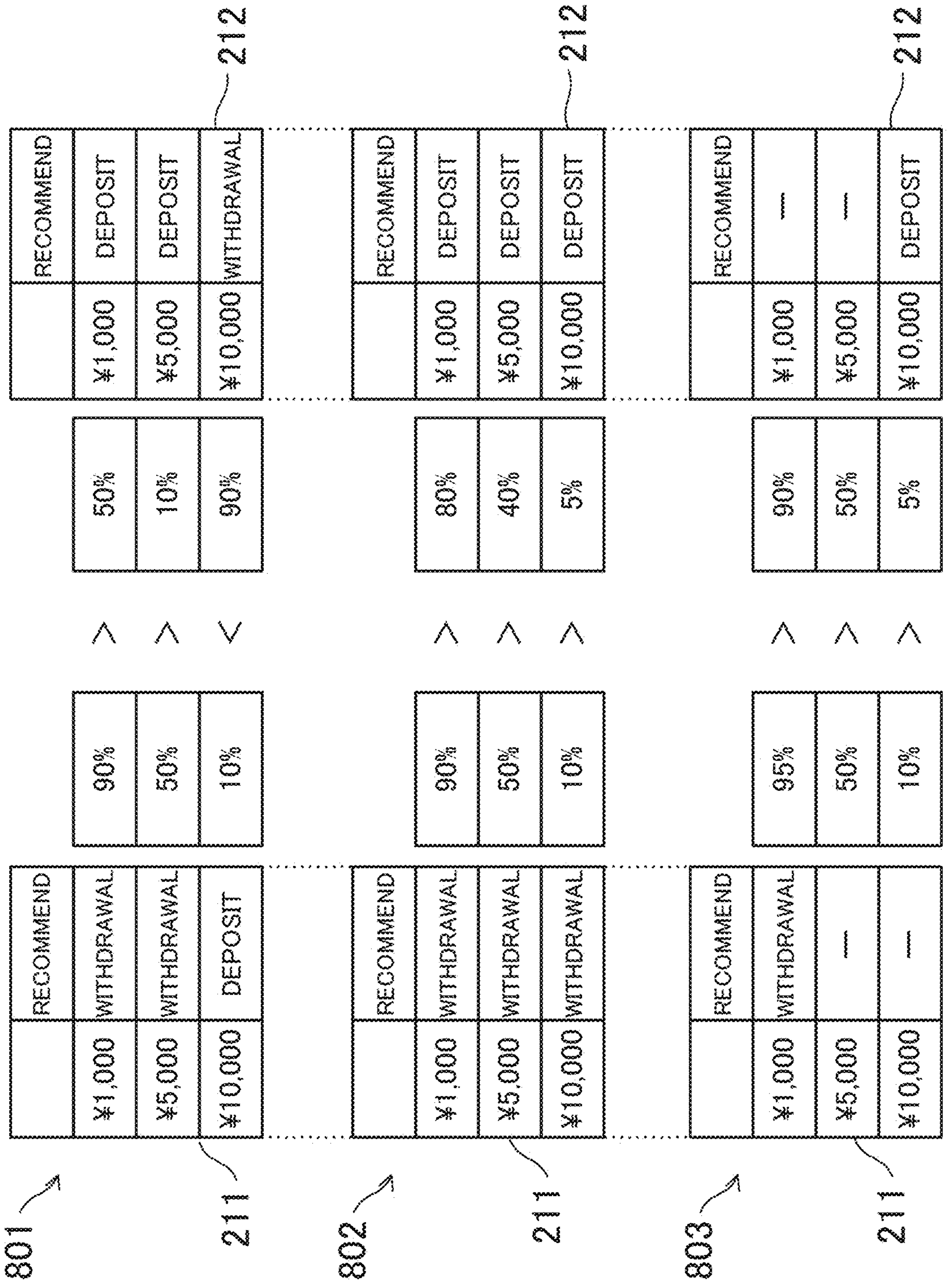
FIG. 8 shows, as an example, contents displayed on the displays of the two money processing devices.

FIG. 8 shows various examples of the notification issued by the management device 11. First, the upper view 801 shows that the inventory amount of the first money processing device 201 includes a 1,000-yen bill of 90%, a 5,000-yen bill of 50%, and a 10,000-yen bill of 10% and the inventory amount of the second money processing device 202 includes a 1,000-yen bill of 50%, a 5,000-yen bill of 10%, and a 10,000-yen bill of 90%. The management device 11 compares the inventory amount of the first money processing device 201 and the inventory amount of the second money processing device 202 according to denomination, thereby determining the notification contents. That is, the management device 11 issues a notification of prompting execution of the first processing in the money processing device 2 with a lower inventory amount and prompting execution of the second processing in the money processing device 2 with a higher inventory amount. The money processing device 2 stores money in different storages according to denomination, and therefore, the management device 11 compares the inventory amount of each storage of the first money processing device 201 and the inventory amount of each storage of the second money processing device 202 with each other. In the example of the upper view 801, the display 211 of the first money processing device 201 issues a notification of prompting execution of the second processing for the 1,000-yen bills and the 5,000-yen bills and prompting execution of the first processing for the 10,000-yen bills. The display 212 of the second money processing device 202 issues a notification of prompting execution of the first processing for the 1,000-yen bills and the 5,000-yen bills and prompting execution of the second processing for the 10,000-yen bills.

The middle view 802 shows that the inventory amount of the first money processing device 201 includes a 1,000-yen bill of 90%, a 5,000-yen bill of 50%, and a 10,000-yen bill of 10% and the inventory amount of the second money processing device 202 includes a 1,000-yen bill of 80%, a 5,000-yen bill of 40%, and a 10,000-yen bill of 5%. As in the upper view 801, the management device 11 issues a notification of prompting execution of the first processing in the money processing device 2 with a lower inventory amount and prompting execution of the second processing in the money processing device 2 with a higher inventory amount. In the example of the middle view 802, the display 211 of the first money processing device 201 issues a notification of prompting execution of the second processing for the 1,000-yen bills, the 5,000-yen bills, and the 10,000-yen bills. The display 212 of the second money processing device 202 issues a notification of prompting execution of the first processing for the 1,000-yen bills, the 5,000-yen bills, and the 10,000-yen bills. For the withdrawal of the 1,000-yen bills, the first money processing device 201 with a higher inventory amount has a priority, and therefore, the inventory amount of the first money processing device 201 can be expected to be decreased. For the deposit of the 1,000-yen bills, the second money processing device 202 with a lower inventory amount has a priority, and this reduces the inventory amount of the second money processing device 202 from being empty. Note that the determination on whether the inventory amount is higher/lower is based on relative inventory amount comparison between the first money processing device 201 and the second money processing device 202. Thus, for example, as in the example of the 1,000-yen bills, the inventory amount of the 1,000-yen bills in the second money processing device 202 is a relatively-high value of 80%. However, since the inventory amount of the 1,000-yen bills in the first money processing device 201 is 90%, a 1,000-yen bill inventory amount of 80% in the second money processing device 202 is a lower value than a 1,000-yen bill inventory amount of 90% in the first money processing device 201, and as a result, a notification of prompting execution of the first processing in the second money processing device 202 for the 1,000-yen bills and execution of the second processing in the first money processing device 201 for the 1,000-yen bills is issued.

The lower view 803 shows that the inventory amount of the first money processing device 201 includes a 1,000-yen bill of 95%, a 5,000-yen bill of 50%, and a 10,000-yen bill of 10% and the inventory amount of the second money processing device 202 includes a 1,000-yen bill of 90%, a 5,000-yen bill of 50%, and a 10,000-yen bill of 5%. The management device 11 issues the notification related to the money processing device 2 based on comparison between the inventory amount of the money processing device 2 and the lower and upper threshold limits. It is assumed that the lower threshold limit is 10% and the upper threshold limit is 90%.

In the example of the lower view 803, the display 211 of the first money processing device 201 issues a notification of prompting execution of the second processing for the 1,000-yen bills. Note that the inventory amount of the 10,000-yen bills of the first money processing device 201 is the lower threshold limit or less, but is higher than the inventory amount of the 10,000-yen bills of the second money processing device 202. Thus, the display 211 of the first money processing device 201 refrains from issuing a notification of prompting execution of the first processing for the 10,000-yen bills. Moreover, since the inventory amount is the lower threshold limit or less, the display 211 of the first money processing device 201 also refrains from issuing a notification of prompting execution of the second processing for the 10,000-yen bills.

The display 212 of the second money processing device 202 issues a notification of prompting execution of the first processing for the 10,000-yen bills. Note that the inventory amount of the 1,000-yen bills of the second money processing device 202 is the upper threshold limit or more, but is less than the inventory amount of the 1,000-yen bills of the first money processing device 201. Thus, the display 212 of the second money processing device 202 refrains from issuing a notification of prompting execution of the second processing for the 1,000-yen bills. Moreover, since the inventory amount is the upper threshold limit or more, the display 212 of the second money processing device 202 also refrains from issuing a notification of prompting execution of the first processing for the 1,000-yen bills.

In the examples of FIGS. 7 and 8, the display 211, 212 issues the notification related to money of each denomination at the same timing. The user can recognize information related to money of all denominations at one view by viewing the display 211, 212. The display form of the display 211, 212 is not limited thereto.

Figure 9:
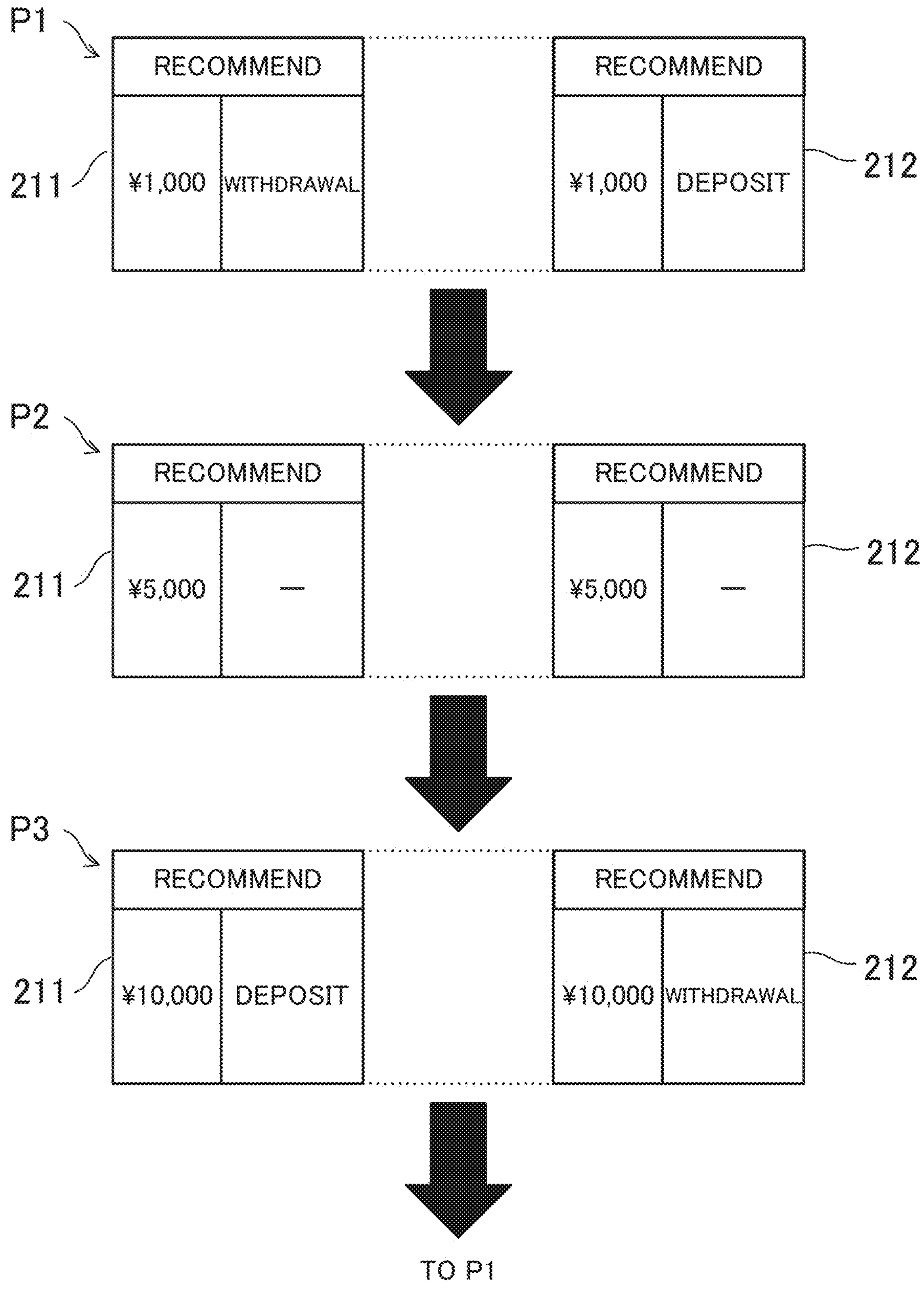
FIG. 9 shows, as an example, contents displayed on the displays of the two money processing devices.

FIG. 9 shows a modification of the display form of the display 211, 212. The contents displayed on the display 211, 212 change in the order of P1, P2, and P3, and returns to P1 after P3. In P1, the display 211, 212 issues the notification related to the 1,000-yen bills. In P2, the display 211, 212 issues the notification related to the 5,000-yen bills. In P3, the display 211, 212 issues the notification related to the 10,000-yen bills. Since the notification for each denomination is sequentially issued, the user easily grasps the notifications related to money of the plural denominations. That is, the display 211, 212 issues a notification for each denomination over time. Note that in FIG. 9, there are no contents of the notification related to the 5,000-yen bills, and therefore, P2 may be omitted.

The display 211, 212 may issue the notification related to money of each denomination at overlapping timing.

Note that the notification management based on the inventory amount of the banknote unit 3 of the money processing device 2 has been mainly described here, but notification management based on the inventory amount of the coin unit 4 is substantially the same as the above-described notification management.

In a case where the money processing device 2 handles a plurality of currencies, the money processing system 1 may execute the notification management based on the inventory amounts of the first money processing device 201 and the second money processing device 202 according to currency. The notification management based on the inventory amount according to currency is substantially the same as the above-described notification management.

(Modifications of Money Processing System)

The money processing system 1 shown in FIG. 1 includes the two money processing devices 2, i.e., the first money processing device 201 and the second money processing device 202. As described above, the number of money processing devices 2 may be three or more.

Figure 10:
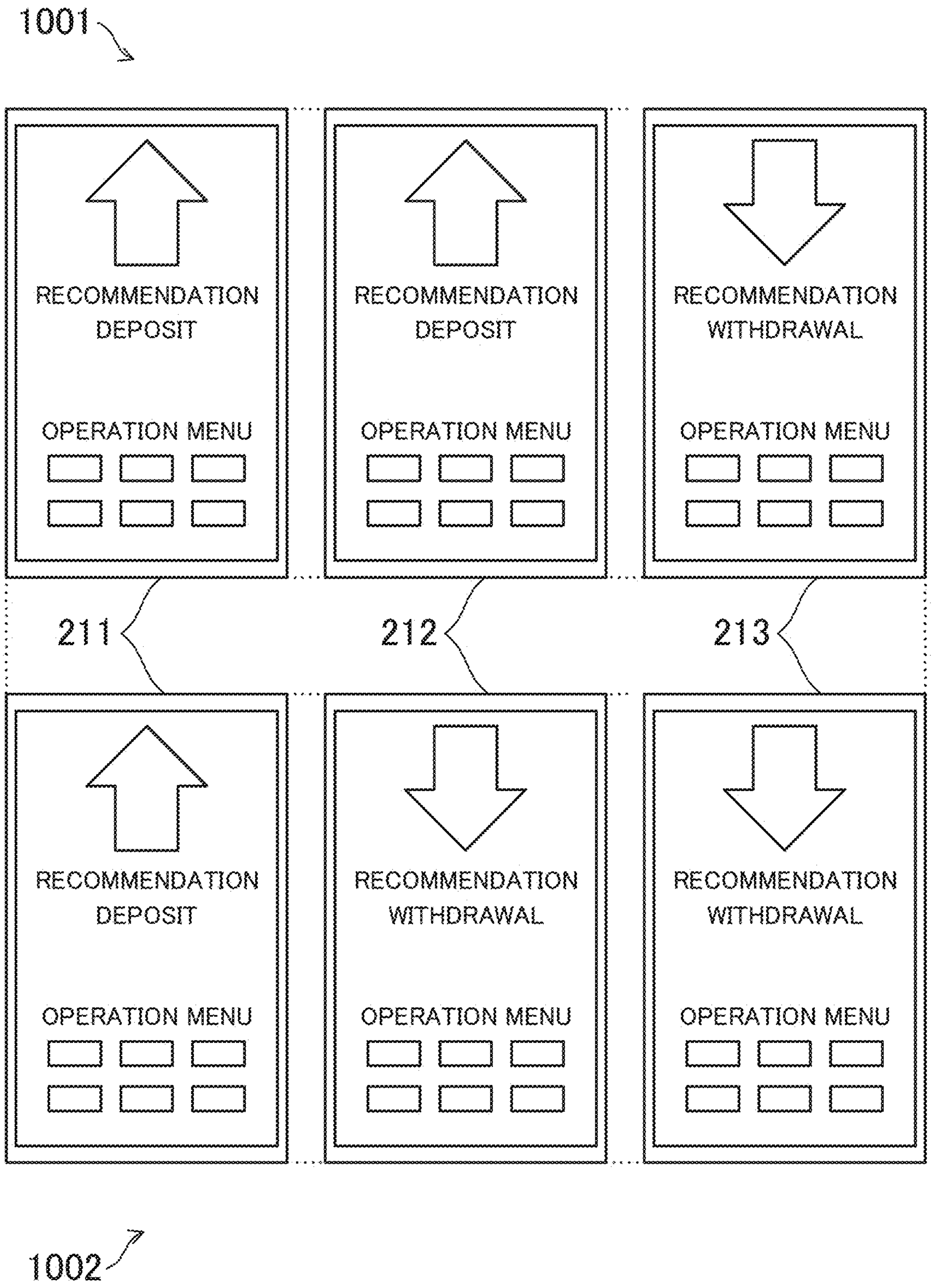
FIG. 10 shows, as an example, contents displayed on displays of three money processing devices.

FIG. 10 shows examples of notification contents on each of the displays 211, 212, 213 in a case where the money processing system 1 includes the first money processing device 201, the second money processing device 202, and a third money processing device. The management device 11 determines the necessity of the notification and the contents thereof based on the inventory amount of the first money processing device 201, the inventory amount of the second money processing device 202, and the inventory amount of the third money processing device.

For example, as shown in the upper view 1001 of FIG. 10, in a case where the display 211 issues a notification of prompting execution of the first processing in the first money processing device 201, a notification of prompting execution of the first processing in at least one of the second money processing device 202 or the third money processing device is not issued. In the upper view 1001, the display 212 issues a notification of prompting execution of the first processing in the second money processing device 202, whereas the display 213 of the third money processing device issues a notification of prompting execution of the second processing in the third money processing device. Note that the display 213 may not need to issue a notification according to the inventory amount of the third money processing device.

As shown in the lower view 1002 of FIG. 10, in a case where the display 211 issues a notification of prompting execution of the first processing in the first money processing device 201, the displays 212, 213 issue notifications of prompting execution of the second processing in the second money processing device 202 and the third money processing device. Note that the display 212 or the display 213 may not need to issue a notification according to the inventory amount of the second money processing device 202 or the inventory amount of the third money processing device.

Since all the money processing devices 2 included in the money processing system 1 do not issue notifications with the same contents, the user can execute the first processing or the second processing in any one of the money processing devices 2. The money processing system 1 can continuously operate the first, second, and third money processing devices while enhancing the processing efficiency using the first, second, and third money processing devices.

The number of money processing devices 2 that issue notifications of prompting the first processing and the number of money processing devices 2 that issue notifications of prompting the second processing may be changed not only based on the inventory amount of the money processing device 2 but also according to various factors such as an area where the money processing system 1 is built, time, and/or season.

The above-described money processing system 1 is the system built at the lobby of the service office of the financial facility, and the money processing device 2 is operated by the client having visited the service office. The money processing system may be, for example, a system built in a counter of a service office of a financial facility.

Figure 11:
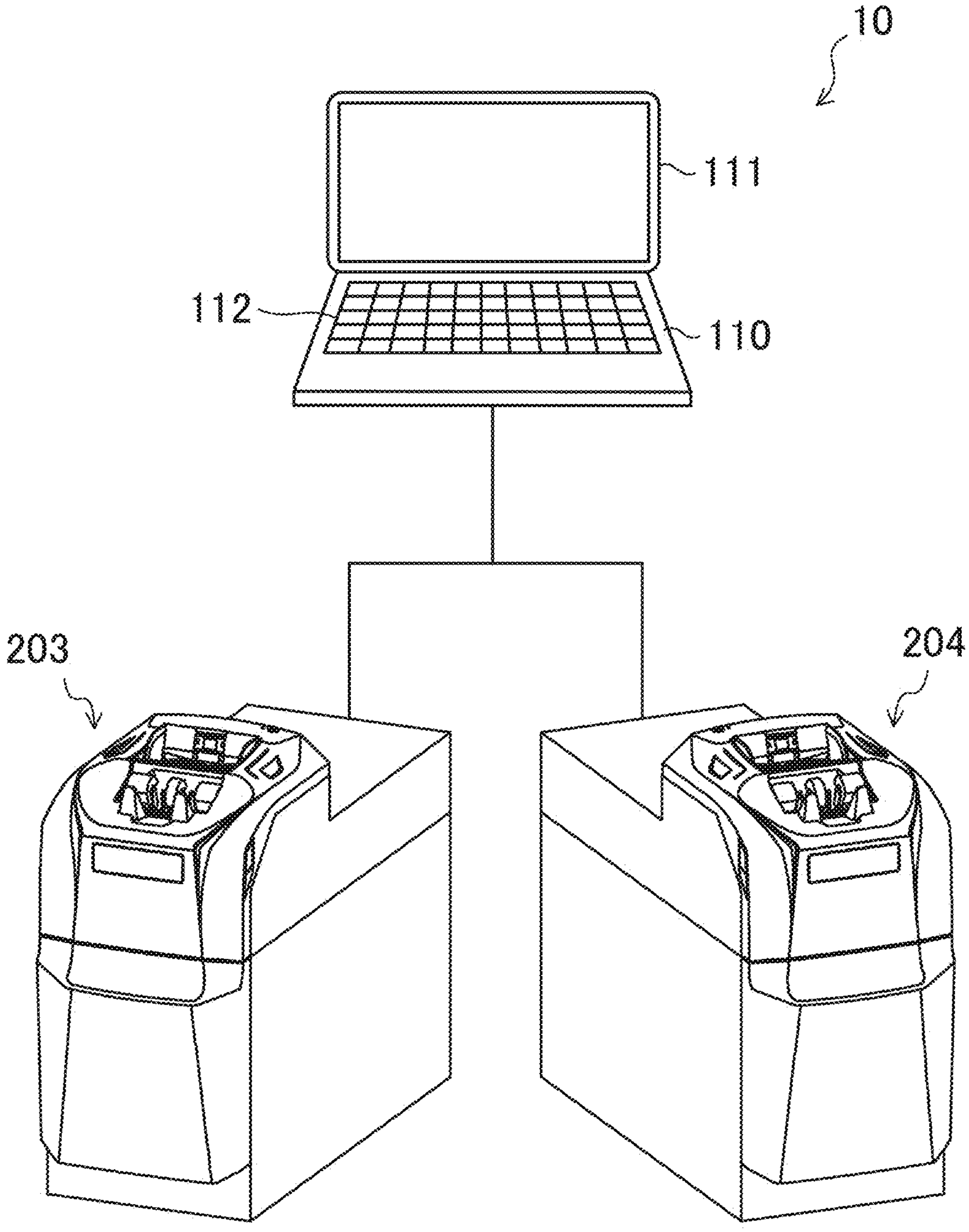
FIG. 11 shows a money processing system according to a modification.

FIG. 11 shows an example of a money processing system 10. The money processing system 10 includes a first banknote processing device 203 and a second banknote processing device 204 as money processing devices. The first banknote processing device 203 and the second banknote processing device 204 have substantially the same structure as that of the banknote unit 3 of FIG. 3. The first banknote processing device 203 and the second banknote processing device 204 are operated by a teller of the financial facility. The first banknote processing device 203 and the second banknote processing device 204 perform the first processing involving the process of taking in a banknote or the second processing involving the process of dispensing a banknote according to teller's selection. Note that the money processing device of the money processing system 10 is not limited to the banknote processing device. The money processing device of the money processing system 10 may be the above-described money processing device 2.

The money processing system 10 includes a computer 110. The computer 110 has a display 111 and a keyboard 112. The computer 110 is connected to the first banknote processing device 203 and the second banknote processing device 204. The computer 110 is equivalent to the management device 11. The computer 110 is operated by the teller. The computer 110 is an operation terminal for the first banknote processing device 203 and the second banknote processing device 204.

The computer 110 issues, based on the inventory amount of the first banknote processing device 203 and the inventory amount of the second banknote processing device 204, a notification of prompting execution of the first processing in the first banknote processing device 203 or the second banknote processing device 204 and a notification of prompting execution of the second processing in the first money processing device 201 or the second money processing device 202. The notification is issued, for example, via the display 111.

The computer 110 performs notification management based on FIGS. 5 to 9. The computer 110 refrains from issuing a notification of prompting execution of the first processing in the second banknote processing device 204 in a case where a notification of prompting execution of the first processing in the first banknote processing device 203 is issued, and refrains from issuing a notification of prompting execution of the second processing in the second banknote processing device 204 in a case where a notification of prompting execution of the second processing in the first banknote processing device 203 is issued.

The teller selects the first banknote processing device 203 or the second banknote processing device 204 according to the notification contents, and performs the first processing or the second processing in the selected banknote processing device. The money processing system 10 can continuously operate the first banknote processing device 203 and the second banknote processing device 204.

Note that the money processing system is not limited to one built at the service office of the financial facility, and may be built as a system used for depositing proceeds from sales and withdrawing a change fund at a retail store.

Note that in the money processing system 1, the management device 11 is not limited to one separated from the first money processing device 201 and the second money processing device 202, and for example, the first money processing device 201 or the second money processing device 202 may have the function of the management device 11. That is, the computer may be included in the first money processing device or the second money processing device.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A money processing system comprising:

a first money processing device that performs first processing involving a process of taking in money or second processing involving a process of dispensing money in response to user selection;

a second money processing device that performs the first processing or the second processing in response to user selection; and a computer connected to the first money processing device and the second money processing device, the computer executing, based on an inventory amount of money stored in the first money processing device and an inventory amount of money stored in the second money processing device, notification management including a notification of prompting execution of the first processing in the first money processing device or the second money processing device and a notification of prompting execution of the second processing in the first money processing device or the second money processing device, wherein the computer refrains from issuing a notification of prompting execution of the first processing in the second money processing device in a case where a notification of prompting execution of the first processing in the first money processing device is issued, and refrains from issuing a notification of prompting execution of the second processing in the second money processing device in a case where a notification of prompting execution of the second processing in the first money processing device is issued.

2. The money processing system of claim 1, wherein the computer issues the notification of prompting execution of the second processing in the second money processing device in a case where the notification of prompting execution of the first processing in the first money processing device is issued, and issues the notification of prompting execution of the first processing in the second money processing device in a case where the notification of prompting execution of the second processing in the first money processing device is issued.

3. The money processing system of claim 1, wherein the first money processing device has a first storage, the first money processing device stores taken-in first money in the first storage and dispenses the first money fed out of the first storage, the second money processing device has a first storage, the second money processing device stores taken-in first money in the first storage and dispenses the first money fed out of the first storage, and the computer executes, based on an inventory amount of the first storage of the first money processing device and an inventory amount of the first storage of the second money processing device, notification management including a notification of prompting execution of the first processing of the first money in the first money processing device or the second money processing device and a notification of prompting execution of the second processing of the first money in the first money processing device or the second money processing device.

4. The money processing system of claim 3, wherein the first money processing device has a second storage, the first money processing device stores taken-in second money in the second storage and dispenses the second money fed out of the second storage, the second money processing device has a second storage, the second money processing device stores taken-in second money in the second storage and dispenses the second money fed out of the second storage, and the computer executes, based on an inventory amount of the second storage of the first money processing device and an inventory amount of the second storage of the second money processing device, notification management including a notification of prompting execution of the first processing of the second money in the first money processing device or the second money processing device and a notification of prompting execution of the second processing of the second money in the first money processing device or the second money processing device.

5. The money processing system of claim 4, wherein the first money is money of a first denomination, and the second money is money of a second denomination different from the first denomination.

6. The money processing system of claim 1, wherein the computer issues the notification of prompting execution of the first processing in the first money processing device or the second money processing device in a case where a storage rate or quantity of money stored in the first money processing device or the second money processing device is a lower threshold limit or less, and the notification of prompting execution of the second processing in the first money processing device or the second money processing device in a case where the storage rate or quantity of the money stored in the first money processing device or the second money processing device is an upper threshold limit or more.

7. The money processing system of claim 1, wherein the first money processing device has a first display, the second money processing device has a second display, and the computer issues the notification of prompting execution of the first processing or the second processing in the first money processing device via the first display, and the notification of prompting execution of the first processing or the second processing in the second money processing device via the second display.

8. The money processing system of claim 1, further comprising:

a projector connected to the computer, wherein the computer issues the notification of prompting execution of the first processing in the first money processing device or the second money processing device via the projector, and issues the notification of prompting execution of the second processing in the first money processing device or the second money processing device via the projector.

9. The money processing system of claim 1, further comprising:

a tablet connected to the computer, wherein the computer issues the notification of prompting execution of the first processing in the first money processing device or the second money processing device via the tablet, and issues the notification of prompting execution of the second processing in the first money processing device or the second money processing device via the tablet.

10. The money processing system of claim 4, wherein the computer performs the notification management by displaying, and displays both the notification related to the first money and the notification related to the second money at overlapping timing.

11. The money processing system of claim 4, wherein the computer performs the notification management by displaying, and sequentially displays the notification related to the first money and the notification related to the second money.

12. The money processing system of claim 1, wherein the first money processing device and the second money processing device are ATMs, self-service machines, or teller machines.

13. The money processing system of claim 12, wherein the first money processing device and the second money processing device perform processing of at least one of a banknote or a coin.

14. The money processing system of claim 1, further comprising:

a third money processing device that performs the first processing or the second processing in response to user selection, wherein the computer executes, based on the inventory amount of the money stored in the first money processing device, the inventory amount of the money stored in the second money processing device, and an inventory amount of money stored in the third money processing device, notification management including a notification of prompting execution of the first processing in the first money processing device, the second money processing device, or the third money processing device and a notification of prompting execution of the second processing in the first money processing device, the second money processing device, or the third money processing device, and the computer refrains from issuing a notification of prompting execution of the first processing in at least one of the second money processing device or the third money processing device in a case where the notification of prompting execution of the first processing in the first money processing device is issued, and refrains from issuing a notification of prompting execution of the second processing in at least one of the second money processing device or the third money processing device in a case where the notification of prompting execution of the second processing in the first money processing device is issued.

15. A money processing method comprising:

performing, by a first money processing device, first processing involving a process of taking in money or second processing involving a process of dispensing money in response to user selection;

performing, by a second money processing device, the first processing or the second processing in response to user selection;

executing notification management by a computer, including a notification of prompting execution of the first processing in the first money processing device or the second money processing device and a notification of prompting execution of the second processing in the first money processing device or the second money processing device, based on an inventory amount of money stored in the first money processing device and an inventory amount of money stored in the second money processing device; and refraining from issuing, by the computer, a notification of prompting execution of the first processing in the second money processing device in a case where a notification of prompting execution of the first processing in the first money processing device is issued, and refraining from issuing a notification of prompting execution of the second processing in the second money processing device in a case where a notification of prompting execution of the second processing in the first money processing device is issued.

* * * * *